(12) United States Patent
Sirpal et al.

(10) Patent No.: US 10,423,305 B2
(45) Date of Patent: Sep. 24, 2019

(54) METHODS AND DEVICE OPERATION FOR CONTROL INCLUDING A PERSONAL DASHBOARD

(71) Applicants: Jamdeo Canada Ltd., Oakville (CA); Hisense Electric Co., Ltd., Qingdao, Shandong (CN); Hisense USA CORP., Suwanee, GA (US); Hisense International Co., Ltd., Qingdao (CN)

(72) Inventors: Sanjiv Sirpal, Oakville (CA); Mohammed Selim, Oakville (CA); Alexander DePaz, Burlington (CA); Salvador Soto, Toronto (CA); Dean Britto, Mississauga (CA)

(73) Assignee: Hisense Electric Co., Ltd., Qingdao (CN)

( * ) Notice: Subject to any disclaimer, the term of this patent is extended or adjusted under 35 U.S.C. 154(b) by 240 days.

(21) Appl. No.: 15/396,134

(22) Filed: Dec. 30, 2016

(65) Prior Publication Data
US 2018/0188903 A1 Jul. 5, 2018

(51) Int. Cl.
*G06F 3/0482* (2013.01)
*G06F 3/0485* (2013.01)
*G06F 3/0484* (2013.01)
*H04N 21/485* (2011.01)
*H04N 21/466* (2011.01)
*H04N 21/482* (2011.01)

(52) U.S. Cl.
CPC .......... *G06F 3/0482* (2013.01); *G06F 3/0485* (2013.01); *G06F 3/04847* (2013.01); *H04N 21/4667* (2013.01); *H04N 21/482* (2013.01); *H04N 21/4858* (2013.01); *G06F 2203/04803* (2013.01)

(58) Field of Classification Search
CPC .................. G06F 21/6218; H04N 5/44543
USPC .................................. 715/763–765
See application file for complete search history.

(56) References Cited

U.S. PATENT DOCUMENTS

| 6,005,565 A * | 12/1999 | Legall | G06F 17/30864 |
| | | | 348/E5.104 |
| 2009/0133069 A1* | 5/2009 | Conness | H04N 5/44543 |
| | | | 725/46 |
| 2012/0054178 A1* | 3/2012 | Tran | H04N 21/45 |
| | | | 707/723 |

\* cited by examiner

*Primary Examiner* — Cao H Nguyen
(74) *Attorney, Agent, or Firm* — Gordon & Rees LLP

(57) ABSTRACT

A method for controlling display device operation including a personal dashboard, the method including: detecting, by a display device, a command to present a personal dashboard based on one or more selections of a displayed control interface of the display device; presenting, by the display device, the personal dashboard corresponding to an active profile in response to the command, wherein the personal dashboard includes: a user image of the active profile, a background image of the active profile, and a content pane including a plurality of graphical elements associated with content titles, the content titles are selected based on the active profile; detecting, by the display device, an input command within the personal dashboard; and updating, by the display device, a presentation output of the display device based on the input command.

20 Claims, 14 Drawing Sheets

METHODS AND DEVICE OPERATION FOR CONTROL INCLUDING A PERSONAL DASHBOARD

FIELD

The present disclosure relates to electronic devices and applications, and more particularly to display and content presentation devices.

BACKGROUND

Recent television devices are designed and developed to provide application and network services in addition to traditional television functions for display of broadcasted content. With the addition of functionalities and components on television devices, there exists a need for control interfaces for applications and television components. In particular, there exists a need for programs and configurations that allow for features of the applications to be presented, accessed and customized on a digital television. While execution of an application and application interfaces exist for digital televisions, there exists a need for improved control of television features. Conventional interfaces do not adapt to content being displayed on a television device. Moreover, conventional interfaces require complex menus with distracting elements and can require extraneous actions for use. There is a desire for contextualized navigation and updating to improve functionality and usability of display devices.

SUMMARY

Disclosed and claimed herein are methods, devices and systems for control of a digital television. One embodiment is directed to a method of controlling display device operation including: detecting, by a display device, a command to present a personal dashboard based on one or more selections of a displayed control interface of the display device; presenting, by the display device, the personal dashboard corresponding to an active profile in response to the command, wherein the personal dashboard includes: a user image of the active profile, a background image of the active profile, and a content pane including a plurality of graphical elements associated with content titles, the content titles are selected based on the active profile; detecting, by the display device, an input command within the personal dashboard; and updating, by the display device, a presentation output of the display device based on the input command.

The command to present the personal dashboard may be a directional command relative to a user interface launcher stage to launch the personal dashboard based on the active profile.

The command to present the personal dashboard may be a directional command relative to an intermediate personal dashboard profile selection configuration.

The personal dashboard may be preconfigured to include graphical elements for the personal dashboard based on user settings of the active profile.

The input command for the personal dashboard may be a selection of a graphical element corresponding to a content title within the content pane.

The input command for the personal dashboard may be a navigation command within the content pane.

The updating the presentation output of the display device may include presenting a user profile selection configuration for selection of one or more user profiles.

The updating the presentation output of the display device may include changing the active profile for the personal dashboard.

The updating the presentation output of the display device may include launching content based on a content title selected in the personal dashboard.

According to some embodiments, there is provided a display device including: a display; a memory having stored thereon computer program code; and a processor coupled to the display and memory. The processor may be configured to execute the program code to: detect a command to present a personal dashboard based on one or more selections of a displayed control interface of the display device; present the personal dashboard corresponding to an active profile in response to the command, wherein the personal dashboard includes: a user image of the active profile, a background image of the active profile, and a content pane including a plurality of graphical elements associated with content titles, the content titles being selected based on the active profile; detect an input command within the personal dashboard; and update a presentation output of the display device based on the input command.

According to some embodiments, there is provided a method for controlling display device operation including a personal dashboard, the method including: detecting, by a display device, a first command to display a profile selection configuration based on one or more selections of a displayed control interface of the display device; presenting, by the display device, the profile selection configuration, the profile section configuration including graphical elements representing one or more user profiles; detecting, by a display device, a second command relative to the profile selection configuration; presenting, by the display device, a personal dashboard corresponding to an active profile in response to the second command, wherein the personal dashboard includes: a user image of the active profile, a background image of the active profile, and a content pane including a plurality of graphical elements associated with content titles, wherein the content titles are selected based on the active profile; detecting, by the display device, an input command to the personal dashboard; and updating, by the display device, a presentation output of the display device based on the input command.

The second command may be a directional command relative to user interface launcher stage to launch the personal dashboard based on the active profile.

The profile selection configuration may include a collection of one or more user profile avatars displayed in a scrollable column.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXAMPLE EMBODIMENTS

One aspect of the disclosure relates to providing a personalized dashboard for a digital television. In one embodiment, a system and framework are provided for presentation a customized dashboard based on an active profile. The customized dashboard may include n avatar image, a background image, and graphical elements corresponding to selectable content. The active user profile may be selected and changed through a profile selection configuration. A user may navigate between the personalized dashboard, the profile selection configuration, and a currently displayed content.

Example implementations of the disclosed technology will now be described with reference to the accompanying figures.

Figure 1:
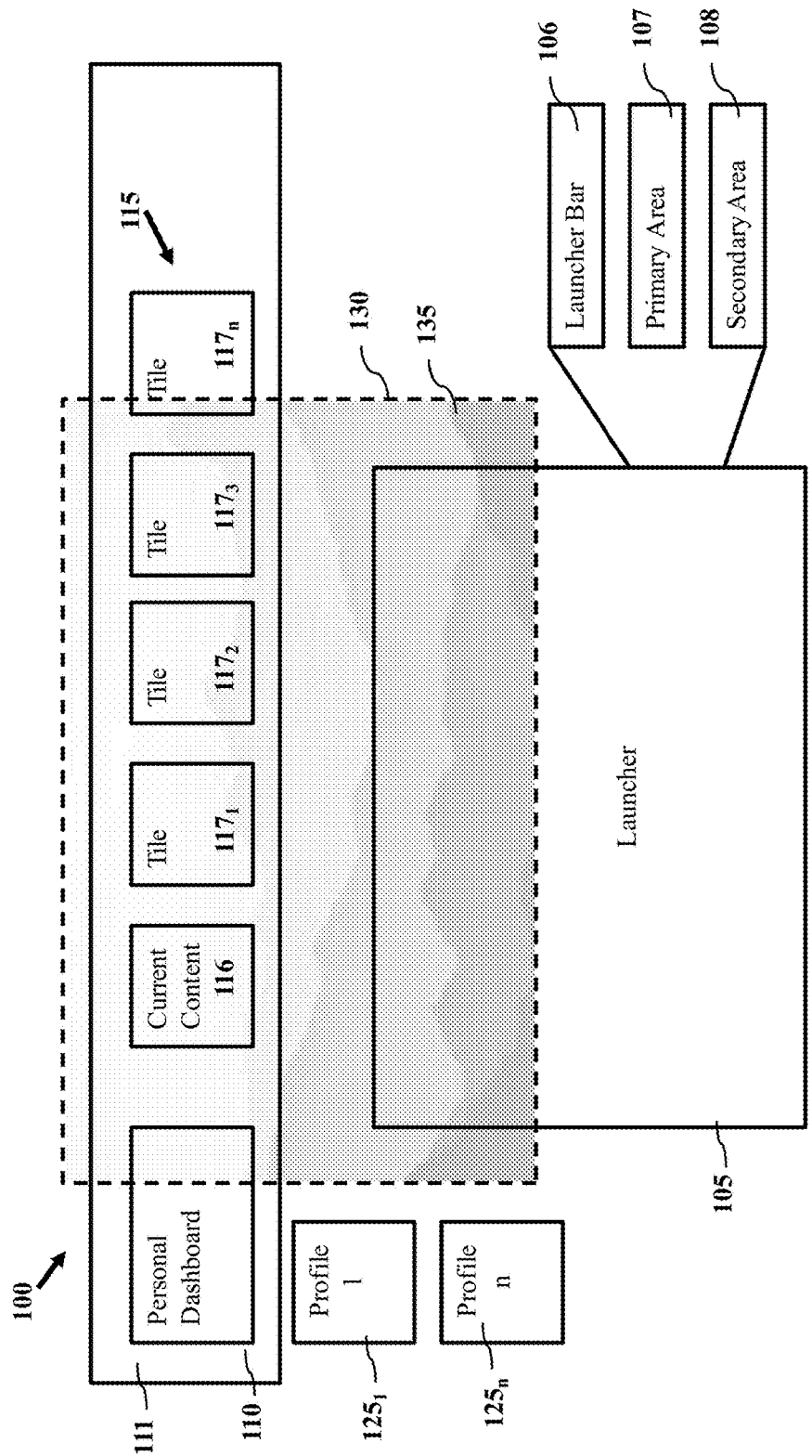
FIG. 1 depicts a graphical representation of a control interface of a display device according to one or more embodiments.

Referring now to the figures, FIG. 1 depicts a graphical representation of a control interface of a display device according to one or more embodiments. According to one embodiment, control interface 100 relates to a graphical user interface presented to control a display device, such as a digital television. According to one aspect of the disclosure, control interface 100 includes a plurality of components that each provide a plurality of functions and features for control and operation of a display device. In addition to providing separate components for particular interaction, control interface may also be configured to operate with a specific arrangement. According to one embodiment, presentation of each component of control interface 100 is presented based on a spatial arrangement model. According to one embodiment, the spatial arrangement model defines a relative position of components of control interface 100 to allow for directional navigation of the interface. By employing a spatial arrangement model, components of the control interface 100 allow for many features of the display device to be easily accessed and controlled. In addition to facilitating access, the spatial arrangement model provides a specific formatting to each view of control interface to emphasize elements for control.

According to one embodiment, components of control interface 100 include launcher component 105, dashboard component (e.g., personal dashboard) 110 and activity strip 115. According to another embodiment, a spatial arrangement model defines the location of each component of control interface 100 relative to a display screen. In an exemplary embodiment, launcher component 105 is oriented relative to a bottom portion of the display, dashboard component (e.g., personal dashboard) 110 is oriented relative to a left side of the display, and activity strip 115 is oriented relative a right side of the display. According to another embodiment, the display format of each component is defined by the spatial arrangement model such that each component may have an initial presentation characterized by a particular format, size, functionalities displayed, etc. Based on navigation commands relative to the control interface, the display device may update and rearrange the position and display format for each component of control interface 100.

Control interface 100 is shown in FIG. 1 relative to a display 130 and display content 135. According to one embodiment, the display format of control interface 100 can include presentation of some or all components of the control interface on display 130. Based on commands detected during presentation of the control interface 100, a display device may update the presentation format and elements of control interface 100 on display 130.

According to one embodiment, control interface 100 provides a mechanism for accessing multiple components of a display device. While the description of FIG. 1 discusses three components of control interface 100 (launcher component 105, dashboard component 110 and activity strip 115), it should be appreciated that additional components may be added to or included with control interface 100. As will be discussed herein, control interface 120 may be employed to control operation of digital television.

Activity bar includes plurality of tile elements 116 and $117_{1-n}$. According to one embodiment, presentation of control interface 100 may be presented as an overlay to content 135 presented on display 130. The display device may freeze or continue presenting the display output of content 135 in a tile element 116 in activity bar 115. In certain embodiments, navigation away from current content tile 116 will pause or stop playback. Current content tile 116 allows for selection of the previously displayed content to return to presentation of the display. Current content tile 116 is presented based on the content displayed by the display device prior to display of control interface 100. Tile elements $117_{1-n}$ relate to activity feed based on current content. In one embodiment, tile elements $117_{1-n}$ relate to a single type of content, such as broadcast TV shows related current content 116 and/or based on viewing habits of an active profile. According to another embodiment tile elements $117_{1-n}$ may be a mix of content types, such as broadcast content, video on demand, applications, etc. In one embodiment, a display device may curate content and features to be included with activity bar as tile elements $117_{1-n}$ and present activity bar as a horizontal deck of elements in horizontal region 111. Horizontal region 111 allows for left and right directional commands to navigate to and within components of control interface 110.

Profiles $125_{1-n}$ relate to one user profiles stored by a display device for control interface 100. In one embodiment, profiles $125_{1-n}$ are utilized to determining display format of the personal dashboard component 110. According to another embodiment, one or more elements of launcher component 105 and activity strip 115 may be presented base on an active profile of profiles $125_{1-n}$. When a profile has not been selected, an active profile may be the last selected or utilized user profile.

According to another embodiment, components of control interface 100 may be selected, navigated and updated based on user interactions with a display device and one or more inputs from a remote control. According to one embodiment, elements of control interface 100 are presented by display device 130, such as digital television, as part of control interface 120.

Presentation of control interface 100 may be in response to a command from remote control, such as selection of a home or menu key. According to another embodiment, control interface 100 may be displayed shortly after a power on of display device 130. According to another embodiment control interface 100 may be presented following presentation of a wake animation and prior to display of a sleep or shutdown animation.

From control interface 100, several features and functions of a display device may be provided by ordered combinations of display device operation and graphical elements presented by the display device.

Launcher

According to one embodiment, launcher component 105 is configured to allow for a user to access content and control features of the display device. In one embodiment, launcher component includes a launcher bar 106, primary area 107 and secondary area 108. Launcher bar 106 may related to a plurality of tab elements arranged in a horizontal strip, wherein selection by moving a highlight element of the display device to a tab element will update the presentation elements of the launcher. By way of example, launcher bar 105 may include a tab for broadcast channels, video on demand and display device settings. Primary area 107 may include presentation of tile elements below the launcher bar 106. Tile elements of primary area 107 may be selected by the display device as the most relevant content of features associated with a selected tab element. Secondary area 108 may be presented below the primary area with additional tiles associated with content and/or display device function. Secondary area 108 may allow for additional selectable elements. According to one embodiment, the display format of launcher bar 106, primary area 107, and secondary area 108 may be based on the presentation status of the control interface. For example, launcher component may be presented initially with launcher bar 106, then commands to expand launcher component (e.g., a directional command) can result in display device updating the display output to include one or more tile elements of the primary area. Tile elements of the secondary area 108 may be presented based on additional navigation within the launcher component.

According to one embodiment, an initial format, such as a home screen presentation, of control interface 100 includes presentation of launcher bar, and a row of tile elements of the primary area. Based on a user input to select and/or navigate within launcher component 105, additional formats may be presented such as an increase in presentation footprint of the launcher to allow for secondary area 108 to include additional rows of tile elements. According to another embodiment, the primary area 107 and secondary area 108 of launcher component 105 may also include a first section for presentation of a most relevant tile element, and a second section for presentation of other tile elements along a horizontal display plane.

According to one embodiment, control interface 100 provides launcher component 105 as an overlay control interface to allow for presentation of content and control features based on selection of launcher tabs and navigation within the launcher component. In one embodiment, the configuration of launcher component 105 is a progression away from traditional desktop menus and allows for simple directional commands to access TV, network, applications, recommendations, personalized configurations, and recent content. According to another embodiment, launcher bar 106 of launcher component 105 includes a plurality of tab or tile elements, wherein each tab allows for a selection of a particular type of content, source of content, and/or control features of a display device. Based on the selection of a tab element of launch bar 106, launcher component may present multiple rows of content/element tiles and allows for scrolling to additional rows within a display window to provide and extended content region. In one embodiment, each row of content tiles may be navigated to based on vertical directional commands (e.g., up/down) and rows of content tiles may be navigated with horizontal directional commands (e.g., left/right). The presentation order of rows and even tiles in each row may be based on one or more of a selected user profile, content presented prior to display of control interface 100 and relevance determinations. In additional to content, such as video and programming information, tiles presented in launcher component 105 may relate to one or more of applications, settings, smart home applications, education/learning applications, gaming, etc.

Launcher Search

According to one embodiment, control interface 100 may include a search functionality component including a graphical interface for searching content titles, applications and elements of launcher component 105. In one embodiment, the search functionality may be presented as a drop down (e.g., down sliding transition) interface from an intermediary presentation format of control interface 100. According to another embodiment, the search functionality can interact with other devices (e.g., mobile devices) with a display device hosting a network interface for entry of search queries. Features of the search functionality can include one or more of a text entry box, alpha numeric display, recent search listing and suggested search results.

Personal Dashboard

According to one embodiment, control interface 100 includes dashboard component 110 to provide a user customizable control interface for a portion of the control features. In one embodiment, dashboard component 110 provides graphical elements for selecting and modifying display attributes and functionality of the dashboard. According to another embodiment, dashboard component can allow for a graphical selection of user profiles that can define features of control interface 100.

According to one embodiment, personal dashboard component 110 allows for presentation of a personalized control interface associated with a user profile. By way of example, display device is configured to allow a user to personalize the display format of the user interface to select display attributes such as a wallpaper, avatar, etc. In that fashion, dashboard component 110 allows for presentation of a personalized control interface. According to one embodiment, control interface 100 can allow for presentation of several user profiles $125_{1-n}$. Selection of the profile may be performed during navigation to personal dashboard component 110 within control interface 100. According to one embodiment, the initial display presentation format of personal dashboard component 110 relates to a tile element, such as a screen capture of the personal dashboard. When an intermediate display configuration of control interface 100 is provided, the same tile representing personal dashboard component 110 may be reformatted. According to one embodiment, personal dashboard component 110 may be displayed adjacent to activity bar 115 in a horizontal region 111 of the display.

In one embodiment, dashboard component 110 provides a display interface to include notifications and access to applications which may be run by a display device. According to another embodiment, dashboard component 110 allows for personalization such as one or more of wake/sleep animations, screensavers, audio themes, badges and gaming. Dashboard component 110 allows for a customizable interface within the overall control interface 100 of a display device.

Touch Interface

Presentation of elements within control interface can include one or more display formats and format changes. In certain embodiments, presentation of elements introduces similarities of touch commands to a display device operated from a distance without actual contact to the display. According to one embodiment, control interface 100 can update presentation of display elements such as tiles to gradually reveal content. According to one embodiment, control interface 100 can receive inputs based on a capacitive touch sensor with gradual display of elements, but also allowing for accidental touches. Capacitive interaction can provide a control feature with a level of touch control for a display device that is normally operated/viewed from a distance. Control interface 100 may be configured with an interaction to model tactile representation for interaction with elements based on a capacitive/interactive remote control. In one embodiment, interaction may include progressive disclosure of content, a multilayered preview into content and instant access to recommendation.

Contextual Touch

According to one embodiment, elements of control interface 100 can support presentation of tile elements as overlay to content without presentation of the full control interface. By way of example, a display device may be configured to recognize a category or genre of actively displayed content and present a display of similar programs to avoid the need to access a display menu and searching of content.

Instant Companion Application and Search

According to one embodiment, control interface 100 can allow for control of a display device by a mobile device and to allow for presentation of graphical display elements of control interface 100 to be displayed by a mobile device. In one embodiment, control interface 100 may host temporary access between a display device and another web enabled device. According to another embodiment, devices may be paired based on displayed elements that may be detected by the web enabled device. Thus, control interface 100 may be configured for pairing/connection with a user interface, such as a personalized user dashboard for display devices and search functions within the launcher control interface. According to certain embodiments, interaction of a mobile device with control 100 does not require a user to download a specific application to establishing the temporary network connection for interaction and control of a display device.

Smart Sense Recommendations

According to one embodiment, control interface 100 can utilize one or more processes for populating content elements within launcher component 105. According to one embodiment, control interface 100 may be presented based on processes for tracking and identifying content for recommendation within the launcher component. For example, content tiles may be arranged in groupings such that groupings with the highest contextual relevance priority are arranged towards the top of launcher component 105.

Conversense

According to one embodiment, control interface 100 and elements of control interface 100 can be utilized by a display device to present a display configured tailored to startup of the display device with information and display elements having high relevance. In one embodiment, elements of the startup display may be selected and presented based on a recognized time of day, personal settings and history.

Figure 2:
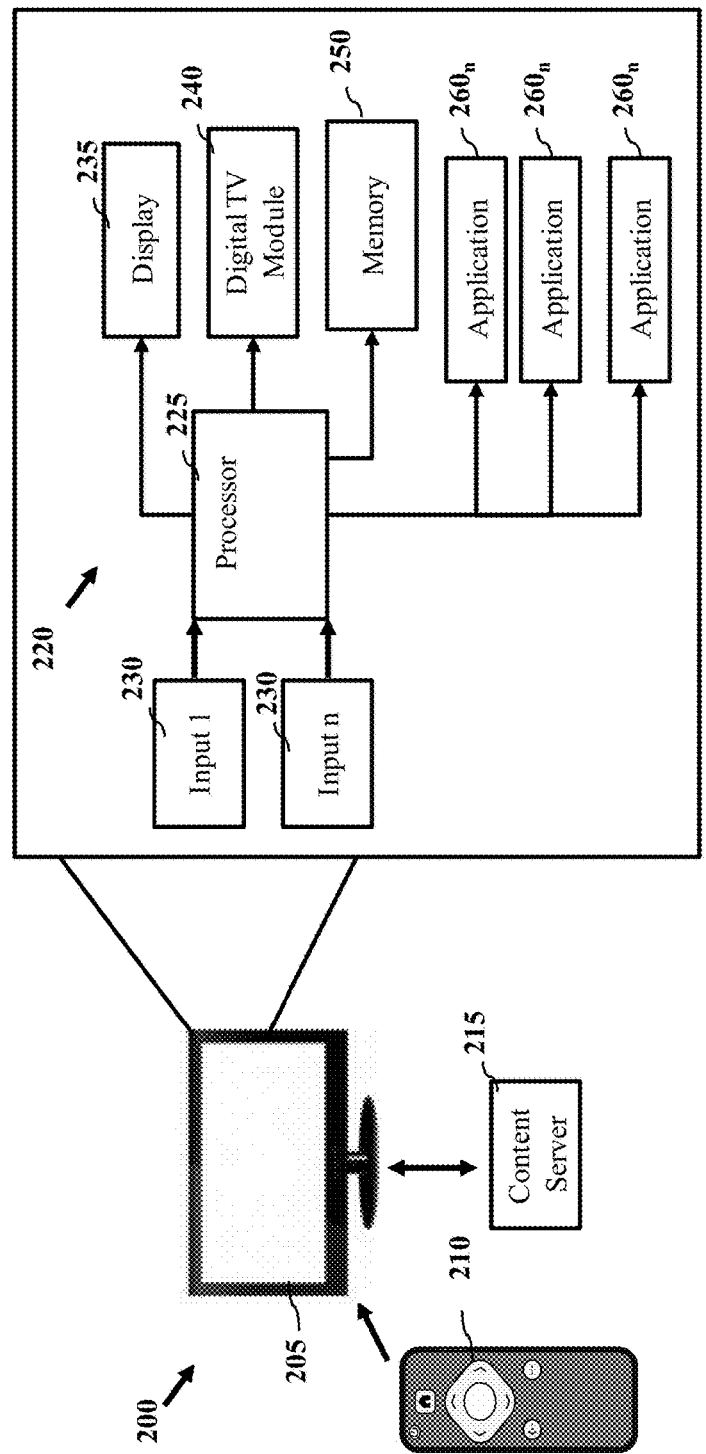
FIG. 2 depicts a simplified system diagram according to one or more embodiments.

FIG. 2 depicts a simplified system diagram according to one or more embodiments. System 200 include display device 205 and remote control 210. Remote control 210 may be configured to provide commands for interaction with and control of display device 205 relative to a control interface (e.g., control interface 100) presented by display device 205. Content, applications and other network services may be provided to display device 205 by way of one or more content servers, such as content server 215.

Digital television 200 includes processor 225, inputs 230, display 235, digital TV module 240, memory 250, and applications $260_{1-n}$. It should be appreciated that digital television 205 may include one or more additional components not shown in FIG. 2. Digital television 205 is configured to present a control interface as described herein.

Inputs 230 relate to physical inputs for receiving video/image content and/or network data for presentation of content on display 235. Digital TV module 240 includes decoder/converter elements to receive information and content from inputs 230 which is then formatted and output to processor 225 for presentation on display 235. Memory 250 may include ROM and RAM memory for operation of digital television 205 and processor 225.

Processor 225, in addition to controlling operation of a digital television, is configured to control presentation and operation of a control interface. According to one embodiment, processor 225 is configured to detect commands for presentation of a control interface for the digital television, present the control interface including an expanded tab element and a plurality of tab elements. Processor 225 may also detect second or additional commands for the control interface to select one of the plurality of tab elements and update presentation of the control interface in response to the commands.

Figure 3:
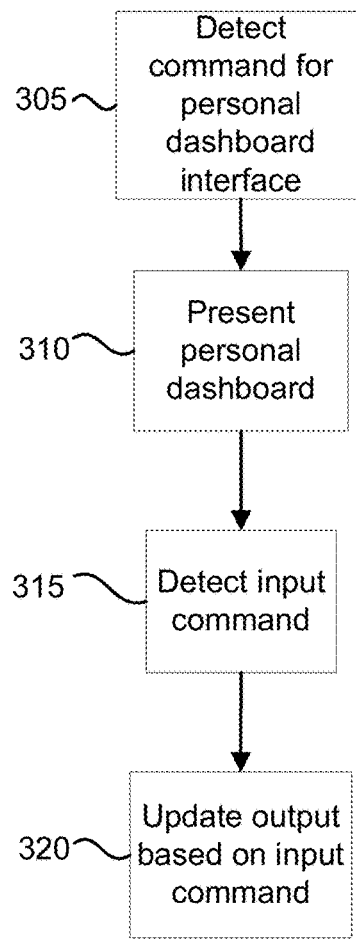
FIG. 3 is a flowchart of a method of controlling a display device according to an example embodiment.

FIG. 3 is a flowchart of a method of controlling a display device according to an example embodiment. The method may be performed by, as non-limiting examples, a display device, e.g., a television or a computer, or a set-top box. Referring to FIG. 3, a display device detects a command for presenting a personal dashboard or a personal dashboard interface at block 305. The command may be based on one or more user interactions with a control interface displayed on the display device. As a non-limiting example, the display device may detect a directional command at block 305 relative to a user interface launch stage to launch the personal dashboard based on an active user profile of the display device. In some embodiments, the command detected at block 305 may be a directional command relative to an intermediate personal dashboard profile selection configuration.

The display device may present the personal dashboard at block 310 in response to the command. The personal dashboard may include a user image of the active profile, a background image of the active profile, and a content pane including graphical elements associated with content titles. The content titles may be selected based on the active profile. According to some embodiments, graphical elements for the personal dashboard may be preconfigured based on user settings. An example embodiment of a personal dashboard will be discussed below with reference to FIG. 7.

The display device detects an input command at block 315 for the personal dashboard, and updates a presentation output of the display device at block 320 based on the command. For example, the input command for the personal dashboard may be a selection of a graphical element corresponding to a content title within the content pane, and the updating 320 may be outputting content of the content title. As another example, the input command for the personal dashboard may be a navigation command within the content pane, and the updating 320 may include updating a presentation of the content pane.

Updating at block 320 may include presenting a user profile selection configuration for selection of one or more user profiles. According to some embodiments, the input command for the personal dashboard may be a selection of a new active profile, and the updating the presentation output of the display device at block 310 includes changing the active profile for the personal dashboard. Changing the active profile may result in changing the user image, the background image, and the content pane.

Figure 4:
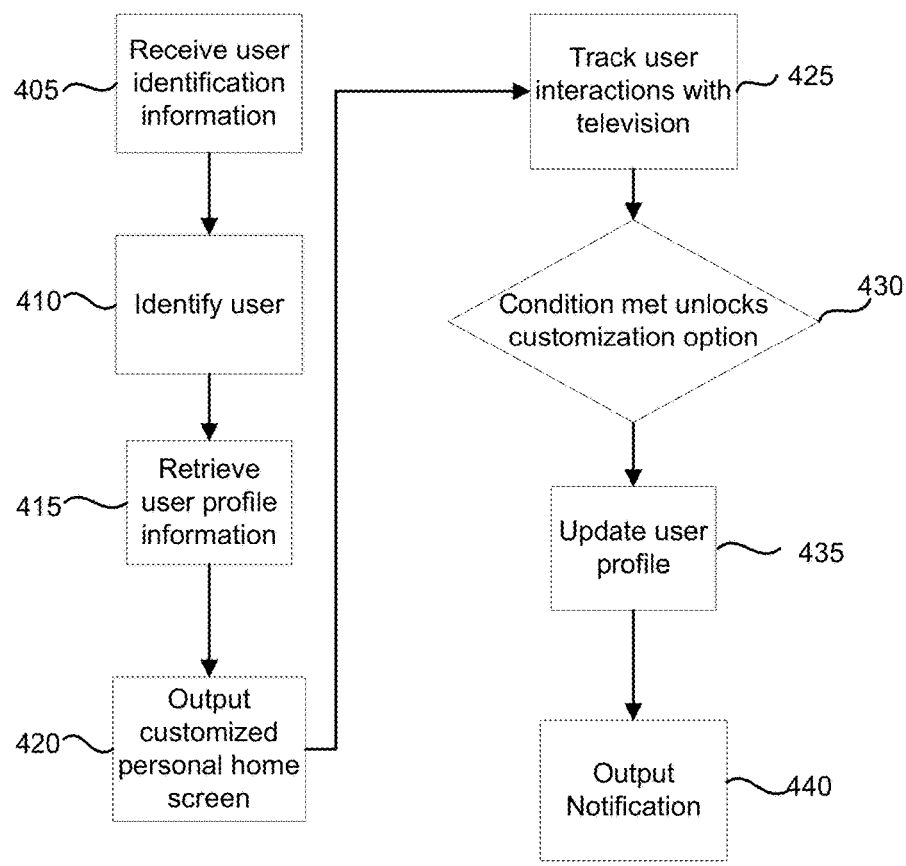
FIG. 4 is a flowchart of a method of controlling a display device according to an example embodiment.

FIG. 4 is a flowchart of a method of controlling a display device according to an example embodiment. The method may be performed by, as non-limiting examples, a display device, e.g., a television or a computer, or a set-top box. At block 405, the display device receives user identification information and identifies a user at block 410. The user identification information may be, as non-limiting example, a selection of a user profile, login information, or matching data to match a user to a user profile.

The display device retrieves user profile information at block 415. The display device may retrieve the user profile information at block 415 from one or more of local storage (e.g., memory, local device, etc.) and remote storage (e.g., network location, server, etc.). The user profile information may include an avatar image of the user profile, preferences of the user profile, and tracking data of the user profile. The display device may set the user profile as an active profile.

Using the retrieved profile information, at block 420 the display device may output a customized home screen, e.g., a personal dashboard. According to some embodiments, the customized personal home screen may include a custom user image and a plurality of scrollable bars including a plurality of personalized content tiles. An example embodiment of a personal dashboard will be discussed below in more detail with reference to FIG. 7.

The display device tracks user interactions with the display device at block 425. For example, the display device may track content accessed by the identified user using the display device, and time of access of the content. While tracking the user interactions, the display device detects at block 430 that a condition has been met to unlock a customization option previously unavailable to the user, e.g., detects a triggering event. For example, the tracking the user interaction may indicate that the user has satisfied a condition for unlocking the customization option. As a non-limiting example, a user viewing a certain movie to completion may unlock a background option of the customized personal home screen.

The display device updates the user profile to indicate unlocking of the customization option at block 435, and outputs a notification of the unlocked customization option at block 440. In some cases, display device may output the notification by displaying the notification overlapping a current content output by the display device.

Figure 5:
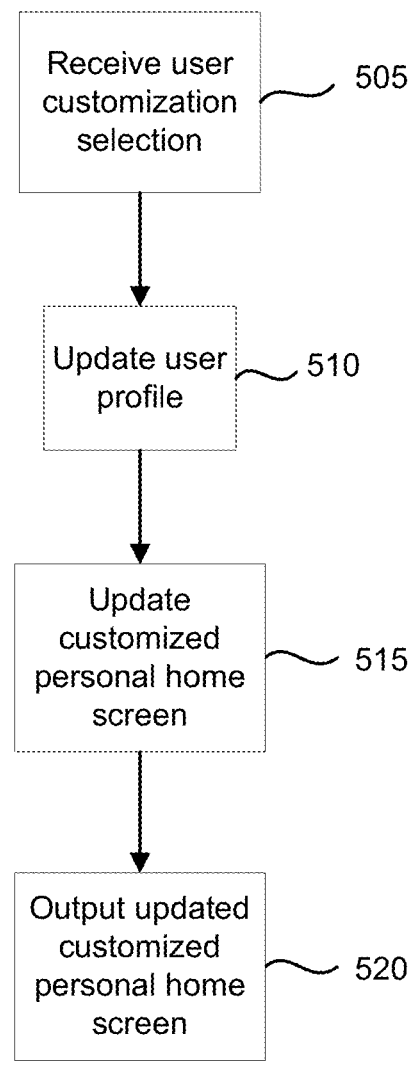
FIG. 5 is a flowchart of a method of controlling a display device according to an example embodiment.

FIG. 5 is a flowchart of a method of controlling a display device according to an example embodiment. The method of FIG. 5 may be performed after detecting 430 the condition unlocking the customization option. The display device may receive a user customization selection selecting the unlocked customization content at block 505. The display device may update the user profile to reflect the user selection at block 510. At block 515 the display device may update the customized personal home screen based on the updated user profile, and output the customized personal home screen at block 520.

Figure 6:
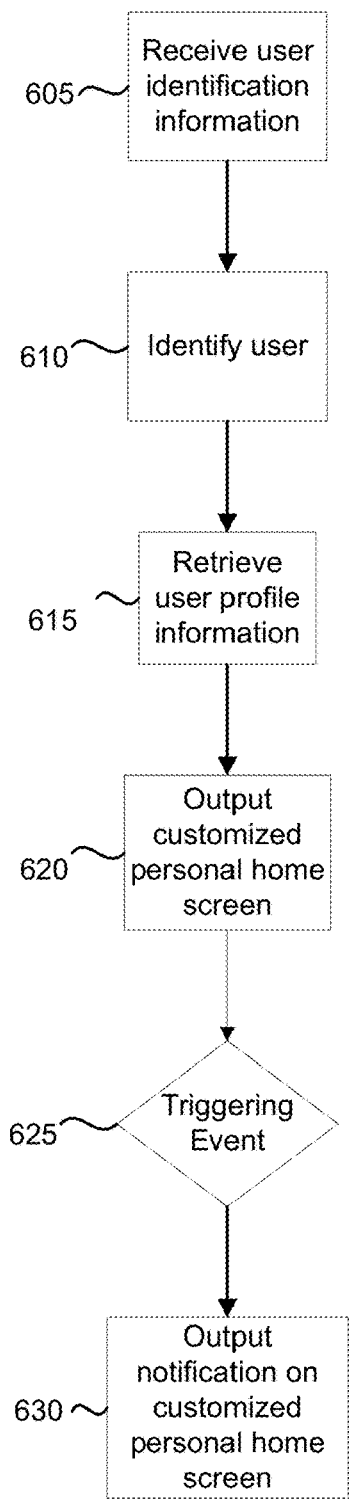
FIG. 6 is a flowchart of a method of controlling a display device according to an example embodiment.

FIG. 6 is a flowchart of a method of controlling a display device according to an example embodiment. The method may be performed by, as non-limiting examples, a display device, e.g., a television or a computer, or a set-top box. The display device may receive user identification information at block 605, identify the user at block 610, retrieve user profile information at block 615, and output a customized personal home screen at block 620 in a manner similar to that discussed above with reference to blocks 405-420 of FIG. 4.

While the customized home screen is output, the display device may detect a triggering event at block 625. The triggering event may be, as non-limiting examples, spending an amount of time accessing a particular content or type of content, an availability of particular content, or an unlocking of a badge. The display device may output a notification on the customized personal home screen corresponding to the triggering event at block 630.

Figure 7:
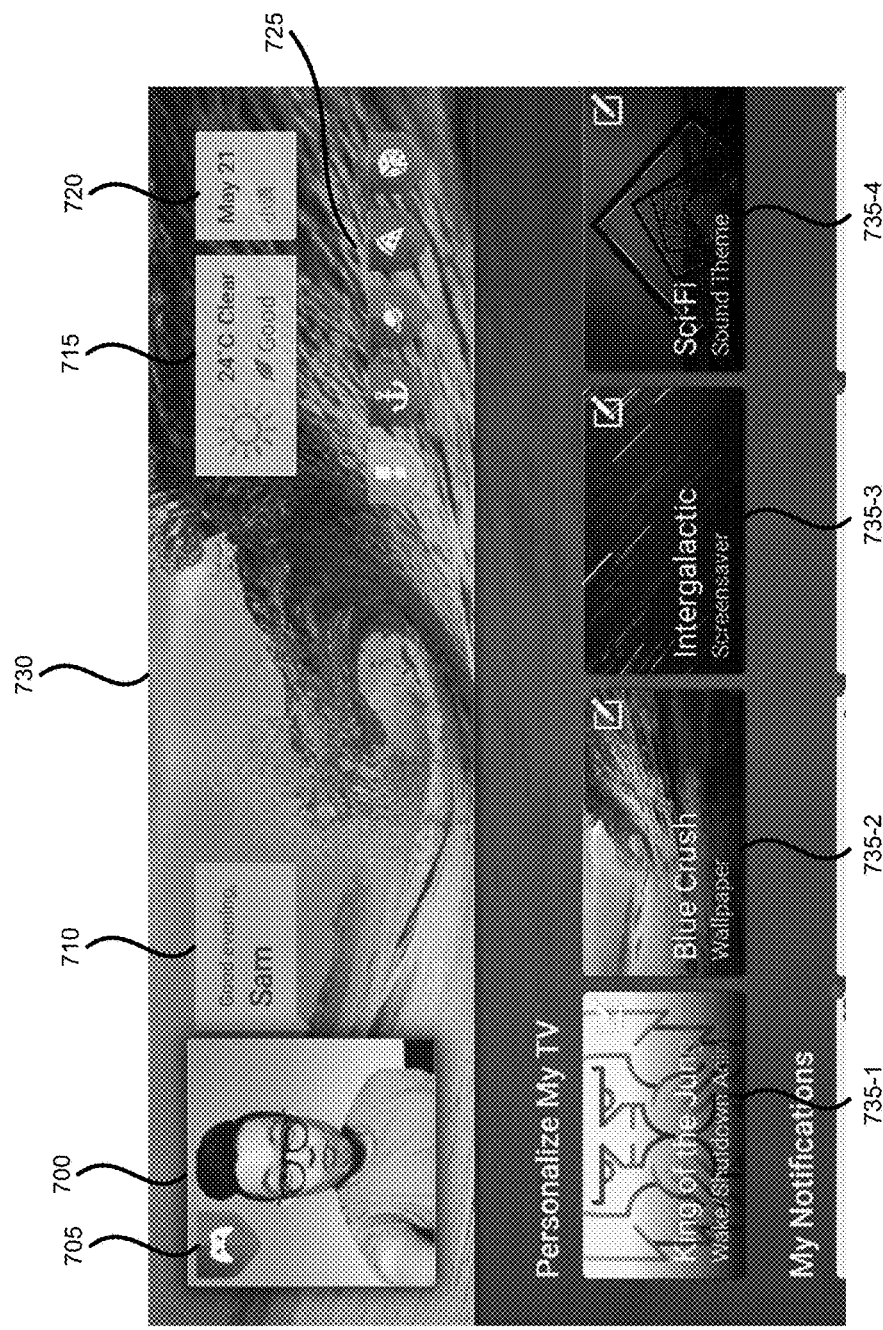
FIG. 7 depicts a graphical representation of a personal dashboard according to one or more example embodiments.

FIG. 7 illustrates a graphical representation of a personal dashboard according to one or more example embodiments. According to one embodiment, a personal dashboard relates to customizable portion of a control interface. The personal dashboard includes a user avatar image 700 and an image 705 of a badge of a recently earned badge overlaid on the user avatar image 700. The user avatar image 700 may be selected by the user. The personal dashboard may include a message bubble 710 located adjacent to the user avatar image, and may include a weather information tile 715, a calendar information tile 720, and images 725 of a collection of badges recently earned by the user. A full screen wallpaper image 730 may be disposed behind the user avatar image 700. The personal dashboard may include a content region having a translucent protection overlay, which may include a plurality of graphical elements 735-1 through 735-4 corresponding to, as non-limiting examples, various content titles, personalization options, and functions of the display device. According to some embodiments, the plurality of personalized graphical elements 735-1 through 735-4 may be determined based on a use history associated with the user profile.

According to one embodiment, one or more of user avatar image 700, wallpaper image 730, and information tiles may be presented in the personal dashboard based on selection of one of more of graphical elements 735-1 through 735-4. In addition to the elements presented in the personal dashboard, graphical elements 735-1 through 735-4 may also be utilized to select wake/sleep and screensaver animations.

Figure 8:
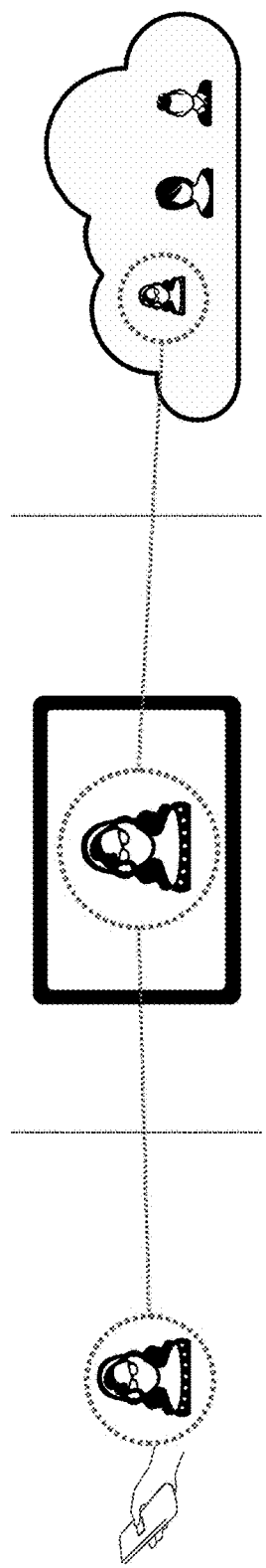
FIG. 8 illustrates a process of retrieving user profile information according to an example embodiment.

FIG. 8 illustrates an environment for implementing one or more example embodiments. As seen in FIG. 8, electronic hardware 810, such as a remote control, cameras, or sensors, may be used to recognize a user. The user may be recognized using a fingerprint detected by a fingerprint reader, facial recognition on an image captures of the user, or through user interactions with the system. Software 820 may be used to provide unique services and recommendations to the user based on the user and profile information. The software 820 may execute on a display device or, in some embodiments, a set-top box. A network server (e.g., cloud server) 830 may be used to store and retrieve appropriate profile and user information, including individualized recommendations and personal dashboard content.

Figure 9:
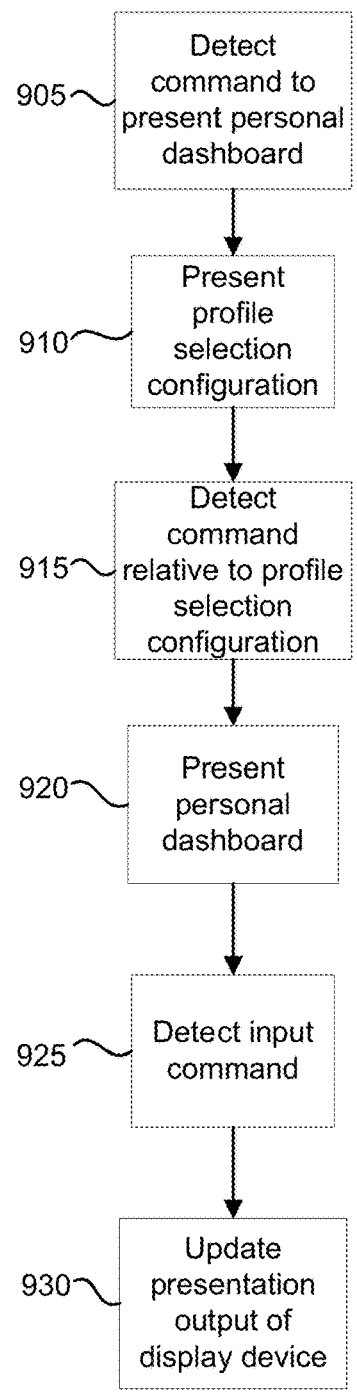
FIG. 9 is a flowchart of a method of controlling a display device according to an example embodiment.

FIG. 9 is a flowchart of a method of controlling a display device according to an example embodiment. The method may be performed by a display device, for example, a television or a computer system, or, in some cases, be performed by a set-top box in connection with a display. Referring to FIG. 9, the display device detects a command to present a personal dashboard at block 905. The command may be received based on one or more selections of a displayed control interface of the display device. The command to present a personal dashboard may be a directional command directed to an intermediate personal dashboard profile selection configuration.

At block 910 in response to the command, the display device presents a profile section configuration including graphical elements representing respective user profiles. The graphical elements may be navigable and selectable by a user. The profile selection configuration may be a collection of one or more user profile avatars displayed in a scrollable column.

The display device detects a command relative to the profile selection configuration at block 915. For example, the command may be a directional command relative to user interface launcher stage to launch the personal dashboard based on an active profile. The command may be a selection of a user profile from the profile section configuration. The selection may make the selected profile the active profile.

The display device presents a personal dashboard at block 920. The personal dashboard may correspond to the active profile. According to some embodiments, the personal dashboard includes a custom user image, a background image and a content pane. The content pane may include a plurality of graphical elements associated with content titles. The content titles may be selected based on the active profile.

The display device detects an input command for the personal dashboard at block 925. For example, the input command may be a selection or navigation within the content pane. At block 930 the display device updates a presentation output of the display device based on the input command. The updating may include presenting the user profile selection configuration for selection of one or more user profiles.

Figure 10:
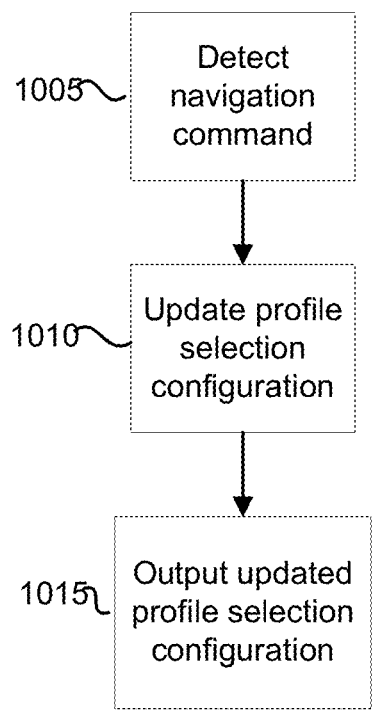
FIG. 10 is a flowchart of a method of controlling a display device according to an example embodiment.

FIG. 10 is a flowchart of a method of the detecting at block 915 a command relative to the profile selection configuration according to an example embodiment. The display device detects a navigation command within the profile selection configuration at block 1005. The navigation command may indicate a desire to navigate between the graphical elements representing respective user profiles.

At block 1010 the display device updates the profile selection configuration and outputs the updated profile selection configuration at block 1015. For example, a portion of a personal dashboard corresponding to a navigated to graphical element may be displayed on the profile selection configuration. In response to detecting the navigation command at block 1005, the display device may update the profile selection configuration at block 1010 from display a portion of a first personal dashboard to display a portion of a second personal dashboard.

Figure 11:
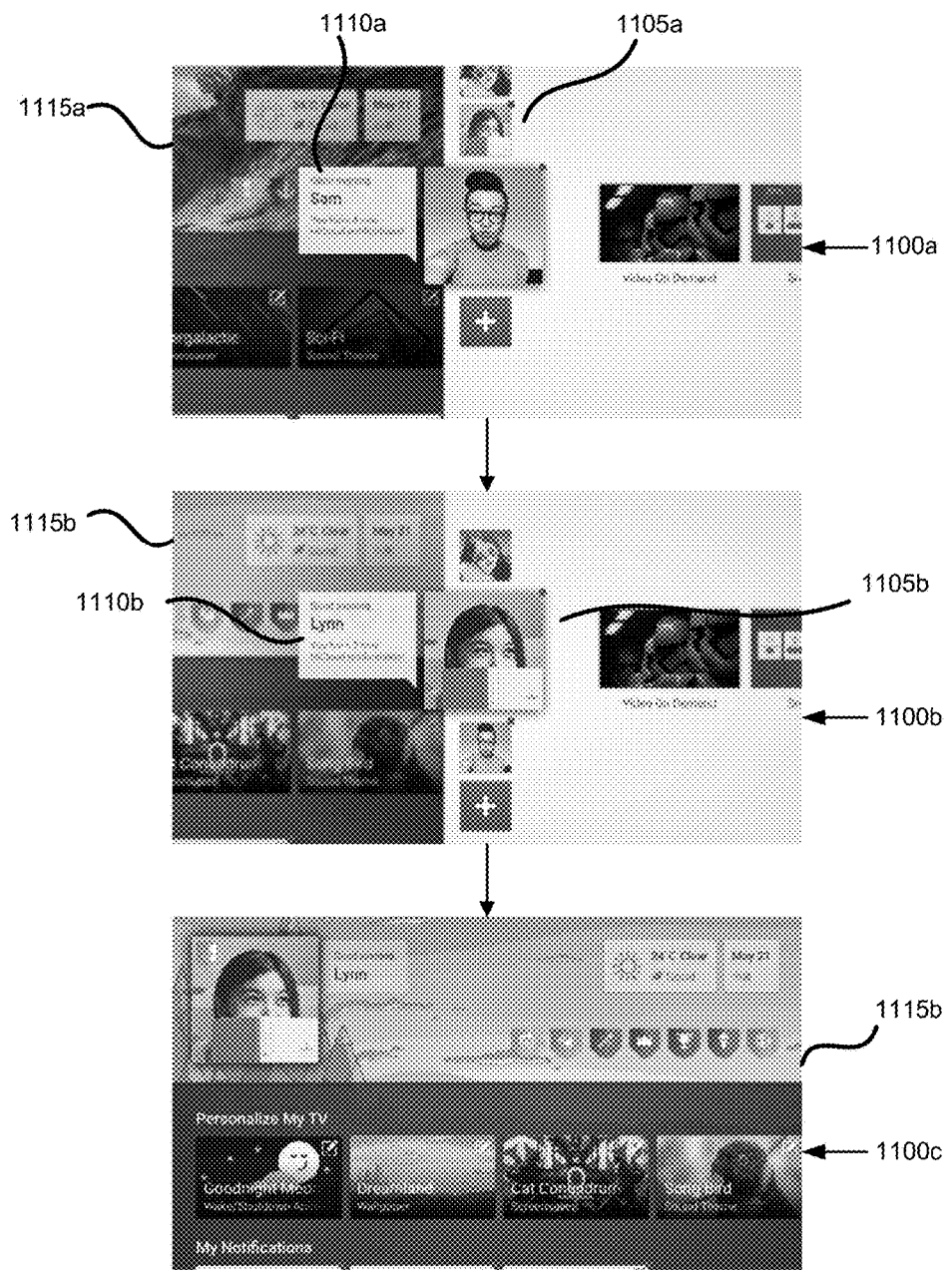
FIG. 11 illustrates a profile selection configuration according to an example embodiment.

FIG. 11 illustrates a profile selection configuration according to an example embodiment. A profile selection configuration is presented in 1100a. A first graphical element 1105a corresponding to a first user profile is navigated to, and a first message 1110a corresponding to the first user profile is displayed near the first graphical element 1105a. A portion of a first personal dashboard 1115a corresponding to the first user profile is displayed.

In response to a navigation command, the display device may update the profile selection configuration 1100b. In 1100b, a second graphical element 1105b of a second user profile is navigated to, and a second message 1110b corresponding to the second user profile is displayed near the second graphical element 1105b. A portion of a second personal dashboard 1115b corresponding to the second user profile is displayed.

In response to a navigation or selection command, the display device may alter the presentation output of the display device 1100c. In 1100c, the second personal dashboard 1115b is presented and the profile selection configuration is no longer displayed.

Figure 12:
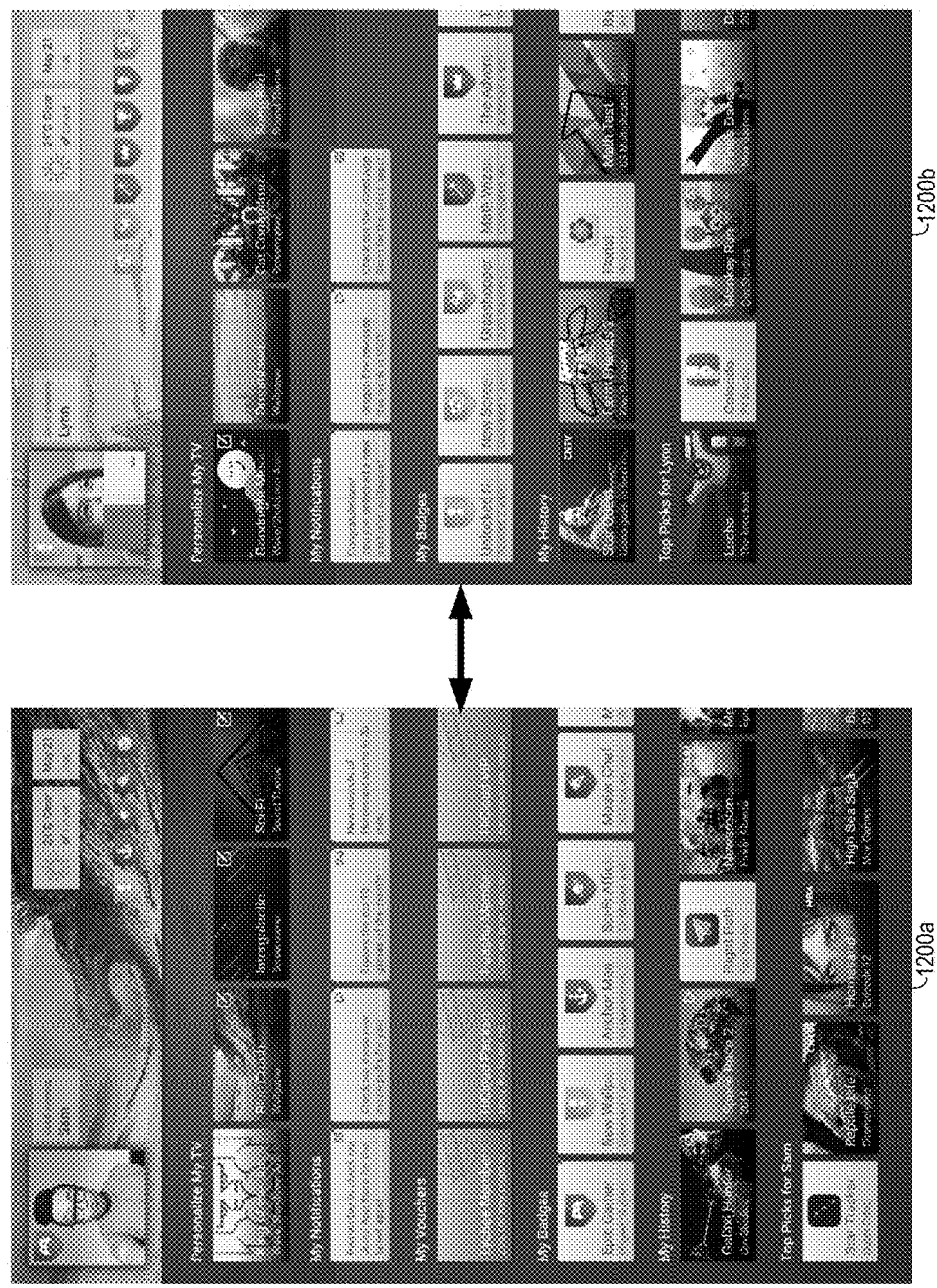
FIG. 12 illustrates differences between personal dashboards associated with different user profiles according to an example embodiment.

FIG. 12 illustrates differences between personal dashboards associated with different user profiles according to an example embodiment. The first personal dashboard 1200a corresponds to a first user. The first personal dashboard 1200a has a plurality of first graphical elements that correspond to the first user. The second personal dashboard 1200b corresponds to a second user. The second personal dashboard 1200b has a plurality of second graphical elements that correspond to the second user. The first and second graphical elements may be similar or disparate. In addition, some categories of graphical elements may not be the same between the first personal dashboard 1200a and the second personal dashboard 1200b. The profile selection configuration may be used to select between the first personal dashboard 1200a and the second personal dashboard 1200b.

Figure 13:
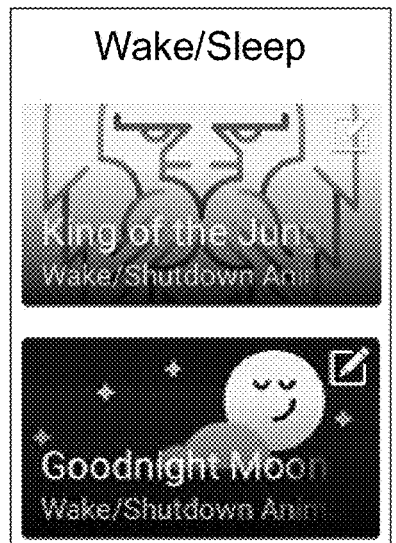
FIG. 13 illustrates customization options according to one or more example embodiments.
Figure 13:
Figure 13:
Figure 13:
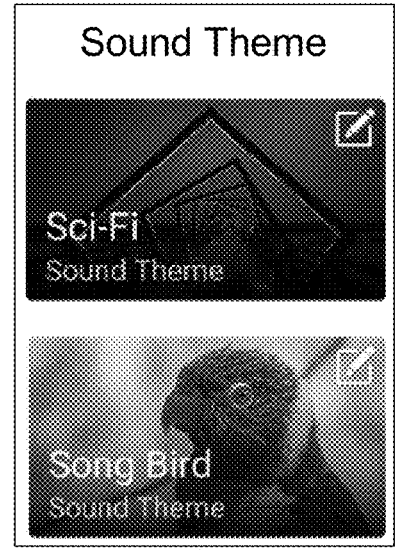

FIG. 13 illustrates a plurality of customization options associated with a personal dashboard. For example, the customization options may be set using a user profile associated with the personal dashboard. In some cases, the customization options may include customized wake and sleep animations 1300a. The wake and sleep animations 1300a may be display when a display device in powering on or off or when a user in logging on or off the display device.

According to some examples, the customization options may include customized wallpaper 1300b to be displayed on the personal dashboard. In some cases, the customization option may include a customized screensaver 1300c. The customized screensaver 1300c may be displayed when a display device having the user profile as the active profile times out.

According to some examples, the customization options may include a sound theme 1300d. The sound theme 1300d may determine what sounds are played as a user interacts with the display device. For example, the sound theme 1300d may determine a sound played as a user navigates around the personal dashboard.

According to some embodiments there may be provided a display including a processor and a memory. The memory may store code that instructs the processor to output a home screen and receive a first user input. The processor may display a collection of one or more available user profiles, e.g., a profile selection configuration, in response to the first input. A second user input may indicate a selection of the user profile, and the processor may retrieve user profile information corresponding to the selected user profile. The processor may then output a customized personal home screen, e.g., a personal dashboard, based on the user profile information.

In some embodiments, the profile selection configuration may include a collection of one or more user profile avatars respectively corresponding to a user profile of the one or more user profiles. The user profile avatars may be displayed in a single, scrollable column.

In some embodiments, the processor may receive a third user input to navigate between the one or more available user profiles within the profile selection configuration. The processor may update the profile selection configuration and output the updated profile selection configuration. The processor may output a message bubble corresponding to a navigated to user profile. The message bubble may include a profile name of the navigated to user profile. A portion of a personal dashboard corresponding to the navigated to user profile may be displayed by the display device, and change based on the navigation.

Figure 14:
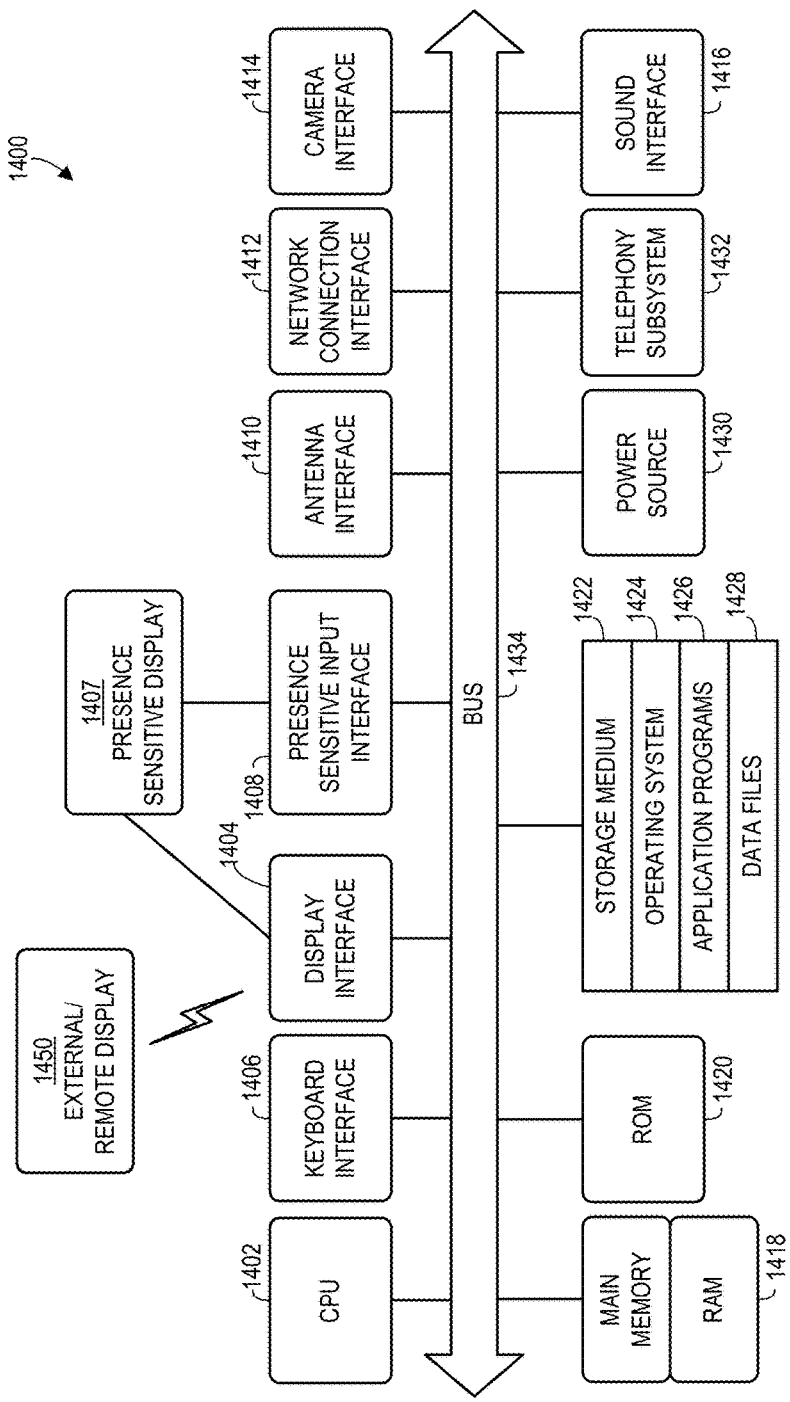
FIG. 14 is a block diagram of an illustrative computer system architecture according to an example implementation.

FIG. 14 is a block diagram of an illustrative computer system architecture 1400, according to an example implementation. According to some embodiments, a display device may be implemented using one or more elements from the computer system architecture 1400. It will be understood that the computing device architecture 1400 is provided for example purposes only and does not limit the scope of the various implementations of the present disclosed systems, methods, and computer-readable mediums.

The computing device architecture 1400 of FIG. 14 includes a central processing unit (CPU) 1402, where computer instructions are processed, and a display interface 1404 that acts as a communication interface and provides functions for rendering video, graphics, images, and texts on the display. In certain example implementations of the disclosed technology, the display interface 1404 may be directly connected to a local display, such as a touch-screen display associated with a mobile computing device. In another example implementation, the display interface 1404 may be configured for providing data, images, and other information for an external/remote display 1450 that is not necessarily physically connected to the mobile computing device. For example, a desktop monitor may be used for mirroring graphics and other information that is presented on a mobile computing device. In certain example implementations, the display interface 1404 may wirelessly communicate, for example, via a Wi-Fi channel or other available network connection interface 1412 to the external/remote display 1450.

In an example implementation, the network connection interface 1412 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1404 may be operatively coupled to a local display, such as a touch-screen display associated with a mobile device. In another example, the display interface 1404 may be configured to provide video, graphics, images, text, other information, or any combination thereof for an external/remote display 1450 that is not necessarily connected to the mobile computing device. In one example, a desktop monitor may be used for mirroring or extending graphical information that may be presented on a mobile device. In another example, the display interface 1404 may wirelessly communicate, for example, via the network connection interface 1412 such as a Wi-Fi transceiver to the external/remote display 1450.

The computing device architecture 1400 may include a keyboard interface 1406 that provides a communication interface to a keyboard. In one example implementation, the computing device architecture 1400 may include a presence-sensitive display interface 1408 for connecting to a presence-sensitive display 1407. According to certain example implementations of the disclosed technology, the presence-sensitive display interface 1408 may provide a communication interface to various devices such as a pointing device, a touch screen, a depth camera, etc. which may or may not be associated with a display.

The computing device architecture 1400 may be configured to use an input device via one or more of input/output interfaces (for example, the keyboard interface 1406, the display interface 1404, the presence sensitive display interface 1408, network connection interface 1412, camera interface 1414, sound interface 1416, etc.) to allow a user to capture information into the computing device architecture 1400. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1400 or may be a separate device. For example, the input device may be an accelerometer, a magnetometer, a digital camera, a microphone, and an optical sensor.

Example implementations of the computing device architecture 1400 may include an antenna interface 1410 that provides a communication interface to an antenna; a network connection interface 1412 that provides a communication interface to a network. As mentioned above, the display interface 1404 may be in communication with the network connection interface 1412, for example, to provide information for display on a remote display that is not directly connected or attached to the system. In certain implementations, a camera interface 1414 is provided that acts as a communication interface and provides functions for capturing digital images from a camera. In certain implementations, a sound interface 1416 is provided as a communication interface for converting sound into electrical signals using a microphone and for converting electrical signals into sound using a speaker. According to example implementations, a random access memory (RAM) 1418 is provided, where computer instructions and data may be stored in a volatile memory device for processing by the CPU 1402.

According to an example implementation, the computing device architecture 1400 includes a read-only memory (ROM) 1420 where invariant low-level system code or data for basic system functions such as basic input and output (I/O), startup, or reception of keystrokes from a keyboard are stored in a non-volatile memory device. According to an example implementation, the computing device architecture 1400 includes a storage medium 1422 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1424, application programs 1426 (including, for example, a web browser application, a widget or gadget engine, and or other applications, as necessary) and data files 1428 are stored. According to an example implementation, the computing device architecture 1400 includes a power source 1430 that provides an appropriate alternating current (AC) or direct current (DC) to power components.

According to an example implementation, the computing device architecture 1400 includes a telephony subsystem 1432 that allows the device 1400 to transmit and receive sound over a telephone network. The constituent devices and the CPU 1402 communicate with each other over a bus 1434.

According to an example implementation, the CPU 1402 has appropriate structure to be a computer processor. In one arrangement, the CPU 1402 may include more than one processing unit. The RAM 1418 interfaces with the computer bus 1434 to provide quick RAM storage to the CPU 1402 during the execution of software programs such as the operating system application programs, and device drivers. More specifically, the CPU 1402 loads computer-executable process steps from the storage medium 1422 or other media into a field of the RAM 1418 in order to execute software programs. Data may be stored in the RAM 1418, where the data may be accessed by the computer CPU 1402 during execution.

The storage medium 1422 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1422, which may include a machine-readable storage medium.

According to one example implementation, the term computing device, as used herein, may be a CPU, or conceptualized as a CPU (for example, the CPU 1402 of FIG. 14). In this example implementation, the computing device (CPU) may be coupled, connected, and/or in communication with one or more peripheral devices, such as a display. In another example implementation, the term computing device, as used herein, may refer to a mobile computing device such as a Smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device or a display device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

According to some implementations, the computer program code may control the computing device to implement a control method as discussed herein.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims and their equivalents. Although specific terms are employed herein, they are used in a generic and descriptive sense only and not for purposes of limitation.

In the foregoing description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementation," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms should be construed to take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a-given sequence, either temporally, spatially, in ranking, or in any other manner.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims and their equivalents, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method for controlling display device operation including a personal dashboard, the method comprising:
    detecting, by a display device, a command to present a personal dashboard based on one or more selections of a displayed control interface of a display device;
    presenting, by the display device, the personal dashboard corresponding to an active profile in response to the command, wherein the personal dashboard includes:
        a user image of the active profile,
        a background image of the active profile, and
        a content pane including a plurality of graphical elements associated with content titles, the content titles are selected based on the active profile;
    detecting, by the display device, an input command within the personal dashboard to present user profile selection configuration, the user profile selection configuration for selection of dashboards;
    updating, by the display device, a presentation output of the display device based on the input command to present the user profile selection configuration, the user profile selection configuration including a portion of the personal dashboard corresponding to the active profile;
    detecting, by the display device, a navigation command to update the user profile selection configuration to display a portion of a second personal dashboard; and
    updating, by the display device, presentation output to present the second personal dashboard.

2. The method of claim 1, wherein the command to present the personal dashboard is a directional command relative to a user interface launcher stage to launch the personal dashboard based on the active profile.

3. The method of claim 1, wherein the command to present the personal dashboard is a directional command relative to an intermediate personal dashboard profile selection configuration.

4. The method of claim 1, wherein the personal dashboard is preconfigured to include graphical elements for the personal dashboard based on user settings of the active profile.

5. The method of claim 1, wherein the input command for the personal dashboard is a selection of a graphical element corresponding to a content title within the content pane.

6. The method of claim 1, wherein the input command for the personal dashboard is a navigation command within the content pane.

7. The method of claim 1, wherein the updating the presentation output of the display device includes presenting a user profile selection configuration for selection of one or more user profiles, the user profile selection including a graphical element and a message for each user profile.

8. The method of claim 1, wherein the updating the presentation output of the display device includes changing the active profile for the personal dashboard.

9. The method of claim 1, wherein the updating the presentation output of the display device includes launching content based on a content title selected in the personal dashboard.

10. A display device comprising:
    a display;
    a memory having stored thereon computer program code; and
    a processor coupled to the display and memory, the processor being configured to execute the program code to:
        detect a command to present a personal dashboard based on one or more selections of a displayed control interface of the display device;
        present the personal dashboard corresponding to an active profile in response to the command, wherein the personal dashboard includes:
            a user image of the active profile,
            a background image of the active profile, and
            a content pane including a plurality of graphical elements associated with content titles, the content titles being selected based on the active profile;
        detect an input command within the personal dashboard to present user profile selection configuration, the user profile selection configuration for selection of dashboards;
        update a presentation output of the display device based on the input command to present the user profile selection configuration, the user profile selection configuration including a portion of the personal dashboard corresponding to the active profile;
        detect a navigation command to update the user profile selection configuration to display a portion of a second personal dashboard; and
        update presentation output to present the second personal dashboard.

11. The display device of claim 10, wherein the command to present the personal dashboard is a directional command relative to a user interface launcher stage to launch the personal dashboard based on the active profile.

12. The display device of claim 10, wherein the command to present the personal dashboard is a directional command relative to an intermediate personal dashboard profile selection configuration.

13. The display device of claim 10, wherein the personal dashboard is preconfigured to include graphical elements for the personal dashboard based on user settings of the active profile.

14. The display device of claim 10, wherein the input command for the personal dashboard is a navigation command within the content pane.

15. The display device of claim 10, wherein the updating the presentation output of the display device includes presenting a user profile selection configuration for selection of one or more user profiles, the user profile selection including a graphical element and a message for each user profile.

16. The display device of claim 10, wherein the updating the presentation output of the display device includes changing the active profile for the personal dashboard.

17. The display device of claim 10, wherein the updating the presentation output of the display device includes launching content based on a content title selected in the personal dashboard.

18. A method for controlling display device operation including a personal dashboard, the method comprising:
- detecting, by a display device, a first command to display a profile selection configuration based on one or more selections of a displayed control interface of a display device;
- presenting, by the display device, the profile selection configuration, the profile section configuration including graphical elements representing one or more user profiles;
- detecting, by a display device, a second command relative to the profile selection configuration;
- presenting, by the display device, a personal dashboard corresponding to an active profile in response to the second command, wherein the personal dashboard includes:
  - a user image of the active profile,
  - a background image of the active profile, and
  - a content pane including a plurality of graphical elements associated with content titles, wherein the content titles are selected based on the active profile;
- detecting, by the display device, an input command to the personal dashboard to present user profile selection configuration, the user profile selection configuration for selection of dashboards;
- updating, by the display device, a presentation output of the display device based on the input command to present the user profile selection configuration, the user profile selection configuration including a portion of the personal dashboard corresponding to the active profile;
- detecting, by the display device, a navigation command to update the user profile selection configuration to display a portion of a second personal dashboard; and
- updating, by the display device, presentation output to present the second personal dashboard.

19. The method of claim 18, wherein the second command is a directional command relative to user interface launcher stage to launch the personal dashboard based on the active profile.

20. The method of claim 18, wherein the profile selection configuration includes a collection of one or more user profile avatars displayed in a scrollable column.

* * * * *